May 31, 1932.  D. A. WHITSON  1,861,039
SOUND RECORDING APPARATUS
Filed May 17, 1928  3 Sheets-Sheet 1
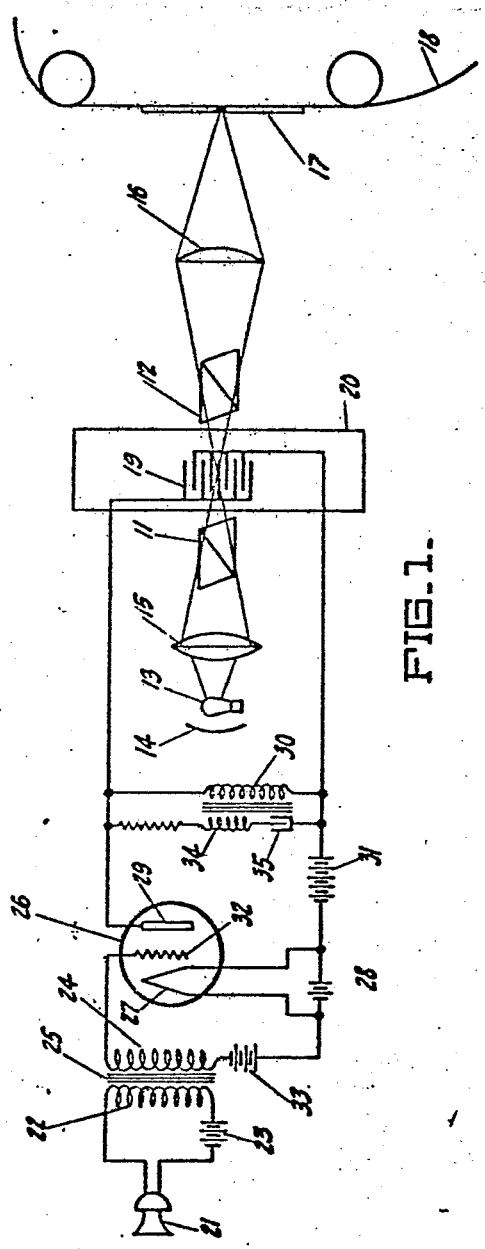
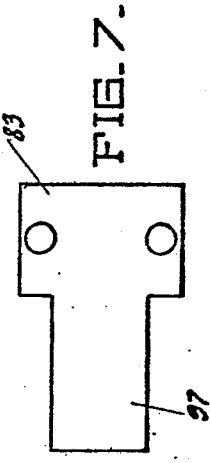
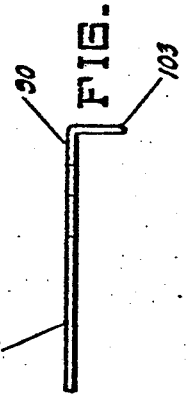
INVENTOR
Delmar A. Whitson
BY
John Flam
HIS ATTORNEY

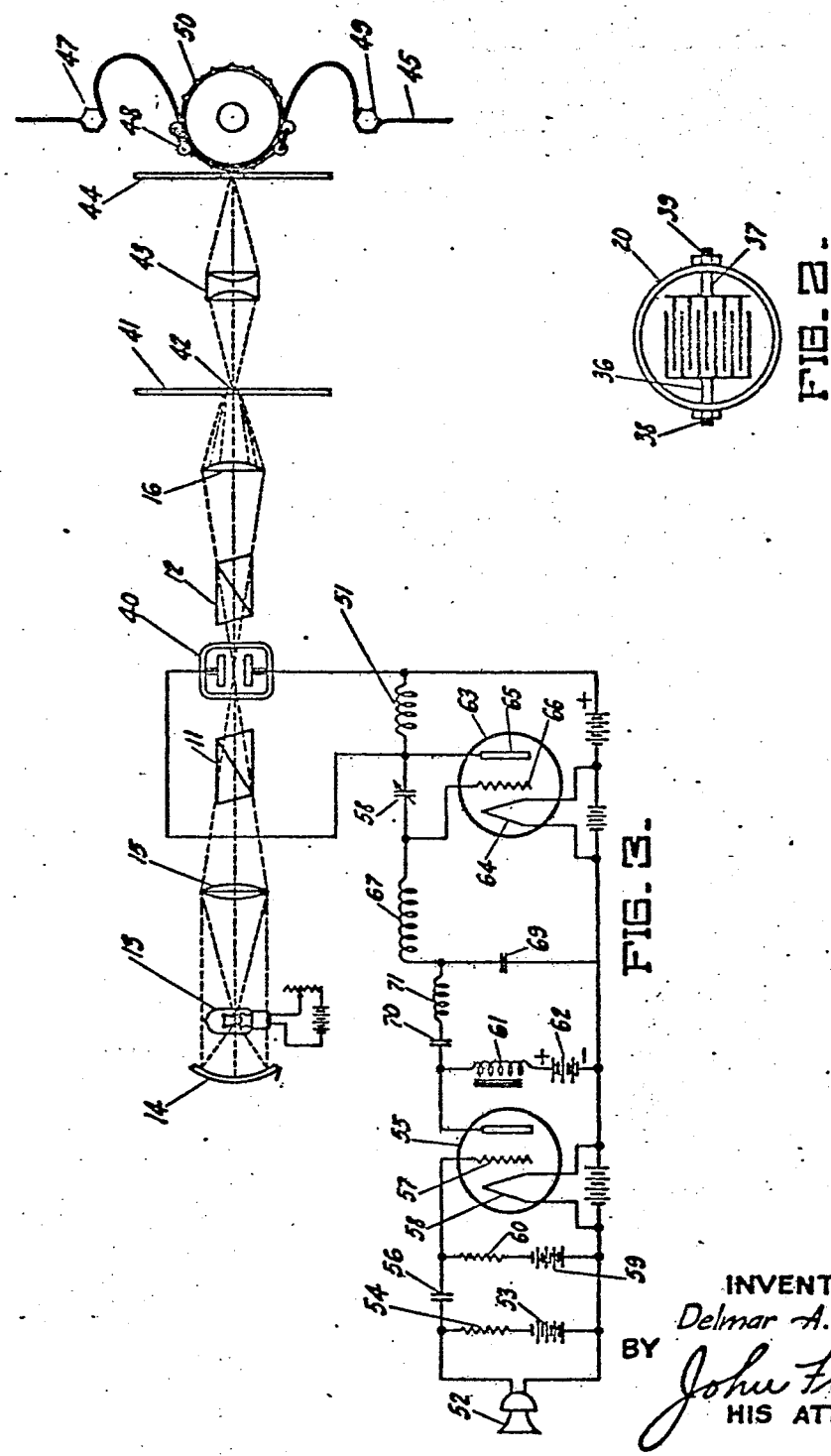

May 31, 1932.  D. A. WHITSON  1,861,039
SOUND RECORDING APPARATUS
Filed May 17, 1928   3 Sheets-Sheet 3
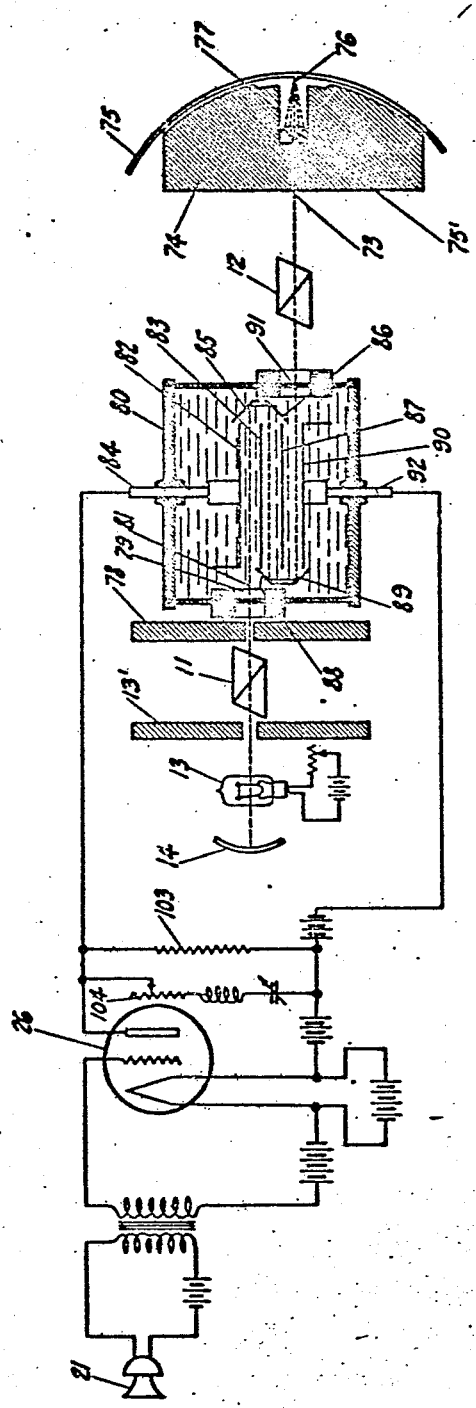
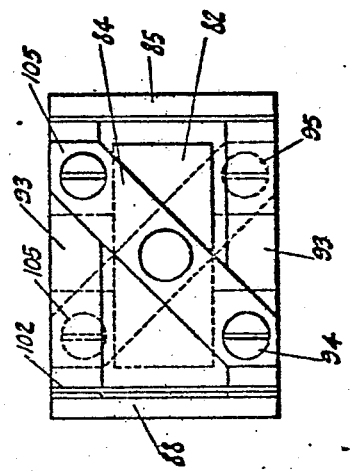
FIG. 6.
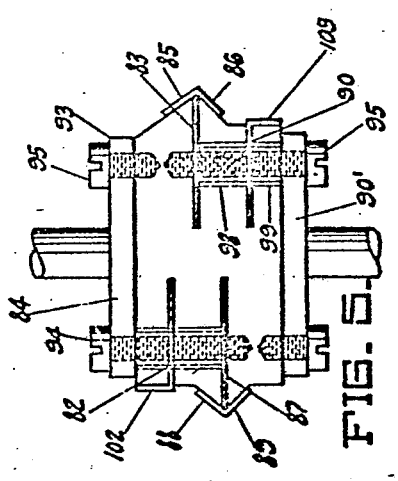
FIG. 4.
FIG. 5.
INVENTOR
Delmar A. Whitson
BY John Flane
HIS ATTORNEY Patented May 31, 1932

1,861,039

UNITED STATES PATENT OFFICE

DELMAR A. WHITSON, OF LOS ANGELES, CALIFORNIA, ASSIGNOR TO WHITSON PHOTO-PHONE CORPORATION, OF LOS ANGELES, CALIFORNIA, A CORPORATION OF NEVADA

SOUND RECORDING APPARATUS

Application filed May 17, 1928. Serial No. 278,554.

This invention relates to the recording of sound, especially by the aid of radiant energy affecting a sensitive medium.

It is now well known that sound records can be produced on a member the physical characteristics of which are affected by radiant energy, such as light, varying in accordance with the sound to be recorded. For example, the density of a film can be thus affected, or the intensity of a light image or any form of sensitive strip, upon running such a strip in connection with an electric circuit that responds to light variations, electrical currents, varying in accordance with these variations in density or intensity are produced; and these varying currents can affect a sound reproducer, such as a loud speaker.

In one scheme for recording sound waves, polarized light is used, the intensity of which is caused to vary in accordance with the sound waves to be recorded. This is accomplished by the aid of a primary and a secondary polarizer, the planes of polarization of which are set at angles to each other; and the rotation of polarized light passing between the two polarizers, is effected in accordance with the sound to be recorded. It is evident that the light which is permitted to pass through both polarizers depends upon the relative angular positions of the plane of polarization of the light, and the plane of polarization of the secondary polarizer or analyzer. If these planes are parallel, a maximum transmission of light occurs; and if they are at right angles, the light is extinguished in the analyzer. Thus it is evident that variations in the relative angles of these planes of polarization cause corresponding variations in the amount of light transmitted.

It is one of the objects of my invention to improve in general the type of sound recording apparatus, which utilizes polarized light in this manner.

In prior schemes, the rotation of polarized light has been affected by varying the intensity of a magnetic field through which the light must pass. However, I find that somewhat better results can be obtained by using an electric, rather than a magnetic, field to influence the polarized light; and it is accordingly another object of my invention to provide a convenient and inexpensive type of sound recording apparatus that utilizes an electric field for influencing the polarized beam.

In such an electric field controlling system, this field is produced between the electrodes of a device that is built substantially like an ordinary fixed condenser, between the plates of which an electromotive force exists. It is still another object of my invention to provide a special structure for this condenser, in such a way that the effectiveness of the electric field is multiplied, and whereby a much larger degree of rotation for the polarized beam can be obtained than in other prior devices.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a wiring diagram of one form of my improved recording device;

Fig. 2 is a detail drawing showing one form of the element that provides the electric field for the polarized light;

Fig. 3 is a schematic diagram of another form of my invention;

Fig. 4 is a schematic diagram of still another form of my invention;

Figs. 5 and 6 are a side view and top plan, respectively, of a detail of the condenser shown in Fig. 4; and Figs. 7 and 8 are details of some of the condenser plates that are used in connection with my device.

In Fig. 1, I show a pair of Nicol prisms 11 and 12, that are spaced apart, across which light can be transmitted from one prism to the other. The planes of polarization of these two prisms are so disposed angularly with respect to each other that when no control action is present, the light attempted to be transmitted through the prisms, is dimmed; that is, the plane of polarization of prism 12 is displaced by an angle that is nearly 90° from the plane of polarization of prism 11.

However, it is well understood that if the plane of polarization of the polarized light in the space between these two prisms is rotated, then the effect is as if one of the prisms would be rotated; and therefore more light will be passed through the analyzer 12. The amount thus transmitted depends upon the degree of rotation of the plane of the polarized light. The greater the rotation tending to parallel to the polarization with the plane of analyzer 12, the more light will be passed through the two prisms.

In the present instance, I show the source of light as a lamp 13 with its reflector 14, which passes its light to a lens system 15, focusing its rays at a point intermediate the two prisms 11 and 12. After the light passes through prism 12, it is converged by a cylindrical lens 16 through an aperture forming plate or iris 17, and onto a moving sensitized strip or film 18. This strip or film 18 can be the usual photographic film; or it may be a sensitized strip of paper. If it be a strip of paper, the record can be formed as a variation in the density of the sensitized surface of the paper, which can be used as a reflecting surface, rather than as a transmitting surface. The film or strip 18 can be moved by any appropriate mechanism, which forms no part of my present invention.

In order to effect the rotation of the polarized light between the prisms 11 and 12, I utilize in this instance a means for providing variations in the electric field transversed by the polarized light. Preferably this means can be formed as a multi-plate condenser 19 encased in an encasing body 20 filled with some liquid substance that is capable of transmitting light, and that provides a medium whereby the rotation of the polarized light is obtained. Such substances are for example mercuric potassium iodide or carbon disulfide. In Fig. 1, the condenser 19 is shown diagrammatically, it being understood that in actual practice the condenser plates shown therein form a series of spaces through which the light can pass; in other words, the condenser 19 is shown as rotated about 90° on its vertical axis from its true position in order to show its structure more clearly. It should be also noted that, the prism 11 should have its plane of polarization displaced about 45° from the plane of the plates in condenser 19 in order that the condenser may effect the rotation of the polarized light between the two prisms and the analyzer 12 should have its plane arranged so that the polarized beam passing therethrough will establish a convenient light level, the intensity of the light being capable of variation both to reduce and to increase it as the field is rotated.

Between the two sets of plates of the condenser 19 are impressed potential differences which vary in accordance with the sound to be recorded. These potential differences in turn cause corresponding differences in the electric field through which the polarized light must pass, and these differences cause corresponding rotation of the polarized light. Therefore, there is a direct functional relation between the potential difference impressed across the condenser 19 and the amount of light that is permitted to pass through both prisms 11 and 12 with the result that record on film or strip 18, which follows faithfully the potential differences on the condenser 19. In case elements 19 be a transparent film, this record takes the form of variations in density of the film. In the case of sensitized paper strip that is ordinarily opaque, the record takes the form of variations in the density of its sensitized surface, which surface can be utilized as a reflecting surface to reproduce the sounds photoelectrically.

The manner in which sound can produce variations in potential difference across condenser 19 will now be described. Sound waves affect transmitter or microphone 21, whereby the current flowing in a circuit connected to the transmitter is correspondingly varied. This circuit can include the primary coil 22 of an iron cored transformer 20 and a source of potential, such as the battery 23. The secondary coil 24 for the transformer 25 can affect the input side of an amplifier 26.

This amplifier is indicated in the present instance as an electronic emission device, having an electron emitting electrode 27 in the form of a filament heated by current, as from a battery 28. This electrode, as well as the anode or plate electrode 29, is enclosed in an evacuated vessel. The electrons emitted from filaments 27 flow to the plate or anode 29, because this plate or anode is kept at a potential positive with respect to filament 27. This is secured by the aid of an external circuit including a heavy inductance or impedance 30 and source of potential 31 such as a battery; which two elements 30 and 31 connect the electrodes 27 and 29 externally of the amplifying device 26.

The electronic emission device 26 also includes a control electrode 32. This is usually in the form of a grid interposed between the electrodes 27 and 29 and serves to control the flow of space current between filament 27 and anode 29. It has been fond that even minute variations in potential impressed between the filament 27 and the control electrode 32 cause correspondingly greater variations in the space current. It is this effect which is utilized for amplification. Therefore, if the potential differences induced in coil 24 by the action of microphone 21 be impressed across the input electrode 27 and 32 of the device 26, then a correspondingly variable space current flow takes place in the ouput circuit including inductance coil 30 and the battery 31. For this purpose, one terminal of coil 24 is directly connected to the grid 32; and its other terminal is connected through the negative bias battery 33 to the filament 27.

By making the impedance coil 30 large enough so as to have a very high inductance, the potential difference across that coil can be made to vary in accordance with the sounds that are impressed upon the microphone 21. This potential difference in turn can be utilized to affect succeeding amplifiers; but since the mode of cascading the amplifiers is now well known, all but the first one 26 is omitted, and the terminals of coil 30 are shown as being directly connected to opposite sides of the condenser 19.

The operation of the system as thus described can now be set forth. The sound affecting the microphone of transmitter 21 produces variations in potential across the input electrodes of the amplifier 26. The output circuit of this amplifier, which includes the heavy inductance coil 30, is caused to produce variations in electric potential across the plates of the condenser 19. The source 13 passes rays or other forms of radiation through the polarizing prism 11, and this plane of polarization is varied in accordance with the potential differences impressed on condenser 19. Therefore, more or less of this light is permitted to pass through the secondary polarizer 12 in accordance with the variations in the potential differences impressed on condenser 19. The light passing through prism 12 is converged by the cylindrical lens 16 through a small aperture in the iris plate 17 and as the film or strip 18 is passed across that aperture, a photographic record of the sounds are thus produced thereon.

In some instances the condenser 19 may have an inherent resonant period, which would interfere with the truthful recording of the sound waves. In order to obviate this, I indicate a trap circuit across the coil 30, including an inductance coil 34 and condenser 35. All currents of a frequency that can disturb the operation of condenser 19 are caused to by-pass through this trap circuit, which is adjusted so as to have minimum impedance at that disturbing frequency.

Fig. 2 shows a form of a condenser 19. In this case, the casing 20 is shown as cylindrical, forming a space in which the plates can be accommodated. The fluid in which the rotation of the light is obtained can be confined in this casing. One set of plates is held by stud 36, and the other set by stud 37, which extend through the walls of the casing 20, and upon which can be formed appropriate terminals 38 and 39. Of course these terminals are appropriately insulated from the casing 20 and from each other.

In the form of the invention just described, straight audio frequency effects are produced; that is, the audio frequency currents are secured by the action of the microphone 21, and these audio frequency variations affect the polarized light. However, it is possible to introduce a higher frequency effect into the system, which higher frequency current can be merely modulated by the audio frequencies secured by the aid of a microphone or its equivalent.

Such a system is indicated in Fig. 3. As in Fig. 1, there is a source of light 13 with its reflector 14 passing light through a condensing lens 15 converging the rays between the two prisms 11 and 12. In the present instance the condenser structure 40 is shown merely as a two plate device, but it can readily take the form described in connection with Figs. 1 and 2. The polarized light which passes between the plates of this condenser 40 is passed through the Nicols prism 12 and thence through the cylindrical lens 16.

In this instance the cylindrical lens 16 converges the rays of light through an objectifying slot 42 provided in the aperture forming iris 41. The image of the slot 42 in plate 41 is reduced in size by reducing lens structure 43, and is caused to enter the aperture in a baffle plate 44. The image of slot 92 is produced as a very narrow one, directly on the surface of the film or sensitized strip 45. This film or strip is shown as wound around sprockets 46, 47, 48, and 49 and onto a larger sprocket support 50, which can be driven by any appropriate mechanism.

The advantages of the slot objectifying device, are that the synchronized film or strip 45 need not be placed in contact with any iris plate such as 41. Instead, merely an image of a comparatively large slot is utilized to affect the film or strip 44, this image being reduced in size so as to form a comparatively thin line on the film or strip 45. Therefore, such serious mechanical annoyances as dirt being trapped in any very narrow slot of opening are obviated.

The variations in potential difference across the plates of condenser 40 are secured in the present instance by modulating radio or high frequency oscillations, and then utilizing the potential differences produced by these oscillations in a coil such as 51, to affect the condenser 40. For this purpose, capacity microphone 52 is utilized, which sets up a variable current in a path including a source of current, such as battery 53, and an impedance such as resistance 54. An amplifier 55 of the type described in connection with Fig. 1 is affected by the potential differences existing across the resistance 54, as by connecting its input electrodes respectively to opposite sides of the circuit including elements 53 and 54. A stopping condenser 56 must be interposed in the input circuit in order to prevent draining of the battery 53. Furthermore, the grid 57 of the device 55 can be kept at a potential negative with respect to the electron emitting electrode 58, as by a negative bias battery 59 and a high resistance 60, which are connected between the grid 57 and filament 58.

The output circuit of amplifier 55 includes the high inductance coil 61 and the plate battery 62. The potential differences across this output circuit are impressed upon the input circuit of an oscillator tube 63.

This tube has the usual three electrodes; that is, the electron emitting electrode 64, the plate or anode 65, and control electrode or grid 66. The input and output circuits of this oscillator 63 are coupled together in order to produce oscillation, in a well understood manner. For example, the input circuit includes the inductance coil 67 and the output circuit includes inductance coil 51, across which potential differences are produced by the action of the apparatus. Also connecting the input and output circuit, is a variable condenser 58 by the aid of which the frequency of oscillation can be adjusted, and whereby a capacity coupling between the two circuits is also afforded. Also a fixed stopping condenser 69 can be utilized between the input electrodes. Across this condenser can be connected the output circuit of the amplifier 55 through a stopping condenser 70 and coil 71.

Since the mode of producing the high frequency oscillation forms no part of my present invention, but may be found in the descriptions of the prior art, further explanation of the action of the oscillator 63 is considered unnecessary; especially since other equivalent oscillatory schemes can be used.

The mode of operation of this system can now be summarized. Sounds that affect the microphone 52 cause amplified variations in potential across the output circuit of the amplifier 55. These variations in potential are caused to affect the high frequency oscillations set up by the oscillator 63 by affecting the input circuit thereof. The potential differences secured across the terminals of the coils 51, which is in the output circuit of the oscillator 63, are impressed upon the condenser 40, and these variations in potential differences cause corresponding variations in the angle of the plane of polarization of the light passing between prisms 11 and 12. The light passing through prism 12 is converged by the cylindrical lens 16 to form a comparatively wide ray of light through the opening 42 and the plate 41. This wide ray is reduced to a very narrow ray by reducing lens structure 43, and this narrow ray is caused to affect the sensitized film or strip 45 as it moves past the baffle plate 44.

In the forms of the invention just described, the polarized light between prisms 11 and 12 is affected by the electrostatic field only once in its passage through the electrostatic field. It is possible, however, by providing a tortuous course for the beam of light, to subject it several times to the action of the electrostatic field, and thereby to produce a much larger degree of rotation than is possible in the devices thus far described. Such a scheme is shown diagrammatically in Fig. 4.

In this figure the control circuits are substantially identical with that shown in Fig. 1. The two prisms 11 and 12 serve the same function as before. The light passing through prism 12 in this instance passes through a comparatively wide slot 73 (about .05" wide) in a block 74 which serves as a support for the sensitized film or strip 75. The wide slot is objectified into a very narrow slit by the aid of the cylindrical lens $75^1$ located in a comparatively deep recess 77 in the block 74. The focus of the rays is located at the surface of the film 75, as indicated at point 76, whereby a very narrow image of the slot opening 73 is provided. The cylindrical lens $75^1$ can be glued, cemented, or otherwise fastened into the bottom of the slot 77 in any appropriate manner. Being located in the bottom of this slot, it prevents such effects as reflection and diffraction from the edges of the slot, and the light must pass through the lens $75^1$ by refraction, and is focused as stated before, on the surface of the film or strip 75.

In the present instance, I utilize a condenser structure in connection with reflectors in such a way that the polarized light passing through the prism 11 is caused to traverse the electrostatic field a number of times before it finally reaches the prism 12. For this purpose, source 13 passes light through a baffle $13^1$ to prism 11; thence the beam of light passes through another baffle 78 to a window 79 in a casing 80. This casing is fluid tight, and can be filled with a transparent liquid such as heretofore stated that assists in increasing the rotation of the plane of polarization when the electrostatic field is varied.

The window 79 can be formed on one side of the casing 80 in any appropriate manner. The light as shown by the dotted line 81 passes through this window and between two plates 82 and 83. The plate 82 can be connected to a terminal post 84 that extends externally of the casing 80. Adjacent the end of the passage between plates 82 and 83, an inclined mirror 85 is provided, which reflects the beam of light 81 onto another inclined mirror 86. The ray of light reflected from mirror 86 is caused to pass between the plate 83 and another lower plate 87. The reflection of the beam 81 can be multiplied; that is, another set of mirrors 88 and 89 can be utilized, to pass the beam between plates 87 and 90. Finally the beam passes through window structure 91, similar to the window 79, and through the prism 12. The multiple reflection of the beam 81 can be carried out to any desired further extent.

The baffle plates 13¹ and 78 are utilized in this instance to guide the light from source 13; instead of lenses. However, the result is substantially the same. By passing the beam of light 81 successively between pairs of condenser plates, it can be more effectively controlled, and the resultant rotation of its plane of polarization is increased. Alternate plates 82 and 87 can be connected electrically together, as well as the alternate plates 83 and 90; for example, plates 82 and 87 can be electrically connected to the terminal 84, and the other two plates can be electrically connected to a similar terminal 92.

In Figs. 5, 6, 7, and 8, I illustrate how the condenser in casing 80 can be constructed. I utilize a pair of blocks 93, 93¹, made from insulation such as hard rubber. These blocks can be clamped together in spaced parallel relationship by the terminal posts 84 and 92. Each block has a series of saw cuts therein which are parallel and spaced apart for the accommodation of the wide parts of condenser plates 82, 83, 87, and 90, shown in detail in Figs. 7 and 8. The posts 84 and 92 can be fastened to blocks 93, 93¹ as by the aid of screws such as 94 and 95.

The fastening screws 94, 95 also pass through appropriate apertures in plates 82, 83, 87, and 90, to hold them in place and also to make electrical contact between these plates and the terminals 84 and 92. Bushings such as 98, 99 can be placed in the blocks 93, 93¹ in the holes through which bolts 94, 95 pass. These bushings can be made of good conducting material to present good contact at its edges with the plates. Shorter screws 105 serve at the opposite ends of blocks 84 and 90 to fasten them to blocks 93, 93¹ without contacting with any of the plates.

In order that the light shall be confined to a beam between the plates as traced by the dotted line 81 in Fig. 4, the end plates 82 and 90 are shown as having the right angled extensions 102 and 103. One of these extensions is shown in detail in Fig. 8.

The reflecting mirrors 85, 86, 88, and 89 can be directly supported on the blocks 93, 93¹ by providing that block with appropriate slanting faces, upon which the mirrors can be appropriately attached.

The operation of this system shown in Fig. 4 is substantially the same as that disclosed in Fig. 1, except that the ray of light passing through the electrostatic field is acted upon a plurality of times instead of only once. This provides a greater degree of rotation for the same variations in potential differences across the condenser structure. In Fig. 4, the output impedance is formed by a large resistance 103 instead of a large inductance. Also, the trap circuit includes a variable resistance 104 whereby its effect can be adjusted.

I claim:

1. In a system for recording sound, means for producing a beam of polarizer radiation, means for creating an electrostatic field for affecting the beam, means in said field for causing the beam to pass a number of times therethrough, an analyzer in the path of the beam, and sound controlled means for varying said field.

2. In a system for recording sound, means for producing a beam of polarized radiation, means for creating an electrostatic field for affecting the beam, means for successively causing the beam to pass back and forth through the field a number of times, an analyzer in the path of the beam, and sound controlled means for varying said field.

In testimony whereof I have hereunto set my hand.

DELMAR A. WHITSON.